United States Patent [19]

McHale et al.

[11] 4,303,782

[45] Dec. 1, 1981

[54] POLYMERIZATION OF CYCLIC ETHERS

[75] Inventors: William D. McHale, Mantua; Joseph G. Bendoraitis, Pitman, both of N.J.

[73] Assignee: Mobil Oil Corporation, New York, N.Y.

[21] Appl. No.: 113,900

[22] Filed: Jan. 21, 1980

[51] Int. Cl.$^3$ ............................................. C08G 65/20
[52] U.S. Cl. ..................................... 528/416; 528/417
[58] Field of Search ................. 528/416, 417; 568/617

[56] References Cited

U.S. PATENT DOCUMENTS

| 3,314,898 | 4/1967 | Furukawa et al. | 528/416 |
| 3,321,412 | 5/1967 | Naro | 528/416 X |
| 4,127,513 | 11/1978 | Bellis | 528/417 X |

*Primary Examiner*—Earl A. Nielsen
*Attorney, Agent, or Firm*—Charles A. Huggett; James F. Powers, Jr.; Edward J. Trojnar

[57] ABSTRACT

A method of polymerizing cyclic ethers especially tetrahydrofuran to form high molecular weight polymers using a zeolitic polymerization catalyst.

7 Claims, No Drawings

POLYMERIZATION OF CYCLIC ETHERS

BACKGROUND OF THE INVENTION

This invention relates to polymers of cyclic ethers and epoxides and to their preparation.

THE PRIOR ART

The polymers of cyclic ethers have been known for some time and have been used in various applications. For example, polytetrahydrofuran (PTHF) has been used in making methane rubbers: low molecular weight PTHF glycols have been chain extended through the hydroxyl end groups to form rubbery polymers of high tensile strength. Copolymers of cyclic ethers either with other cyclic ethers or other monomers are also known, for example, copolymers of tetrahydrofuran (THF) with ethylene oxide, styrene or isobutene. The polymers of the cyclic ethers have generally been characterised by a high tensile strength and elongation. Accordingly, they are useful in applications requiring a rubbery material.

The polymers of the cyclic ethers have been prepared by the cationic polymerisation of the monomers. The catalysts used have generally been of the Lewis acid type. An article by Dreyfus and Dreyfus, Advances in Polymer Science 4, 528 (1967), reviews the types of catalyst which have previously been used. They include:

(1) Metal halide adducts with active hydrogen containing compounds, e.g. $FeCl_3$ or $AlCl_3$ with alpha-chloro-dimethyl ether or benzyl chloride.

(2) Unsaturated tertiary oxonium salts. In these salts, the anion is usually derived from a Lewis acid, e.g. $BF_4^-$, $SbCl_6^-$.

(3) Other materials including complex inorganic acids such as $HClO_4$, $HBF_4$, $HSO_3F$, $H_2SnCl_6$; acylium salts from Lewis acids and acylating agents; aluminum alkyls and haloalkyls such as $AlEt_3$, $AlEt_2Cl$, $AlEtCl_2$ with a cocatalyst such as water or epichlorohydrin.

Many of the catalysts used up to the present have given only liquid polymers and conversions have varied widely.

SUMMARY OF THE INVENTION

We have now found that zeolites are capable of polymerising tetrahydrofuran and other cyclic ethers to form high molecular weight solid products in good yields. According to the present invention we therefore provide a method of preparing a polymer of a cyclic ether which comprises contacting the ether with a zeolite polymerisation catalyst.

The cyclic ethers which may be polymerised by this method may contain a 1,2-epoxy group as in 1,2-epoxy cyclohexane, 1,2-epoxypropane or 1,2-epoxystyrene or, alternatively, the oxygen may form part of a more highly extended ring system as in the preferred species, tetrahydrofuran (1,4-epoxybutane).

Whether a particular cyclic ether is polymerizable under the present conditions can be readily determined by a simple test, in which a mixture of dry, purified monomer is mixed with a dry zeolite catalyst, and allowed to stand in a sealed container for about 24 hours, at which time any polymerisation becomes evident from a thickening of the suspension. Tetrahydrofuran, 1,2-epoxy cyclohexane, 1,2-epoxy propane and styrene oxide are readily polymerised in quantitative amounts and are therefore preferred monomers. Tetrahydrofuran is particularly preferred.

The polymerisation catalyst is a crystalline aluminosilicate zeolite. These materials have a three dimensional lattice of $SiO_4$ and $AlO_4$ tetrahedra cross-linked by the sharing of oxygen atoms. Although a wide range of zeolites may be found to possess polymerisation activity, the preferred catalysts for use according to the present invention are those having a Constraint Index of from 1 to 12. The Constraint Index can be explained as follows:

Many zeolites are capable of converting aliphatic hydrocarbons to aromatic hydrocarbons in commercially desirable yields and are generally highly effective in conversion reactions involving aromatic hydrocarbons. Zeolites with unusually low alumina contents, i.e. high silica:alumina ratios, are very active even when the silica to alumina ratio exceeds 30. This activity is surprising since catalytic activity is generally attributed to framework aluminum atoms and the cations associated with these aluminum atoms. These zeolites retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity. In many environments the zeolites of this class exhibit very low coke-forming capability, conducive to very long times on stream between burning regenerations.

An important characteristic of the crystal structure of this class of zeolites is that it provides constrained access to (and egress from) the intracrystalline free space by means of a pore dimension greater than about 5 Angstroms and pore windows of approximately the size which would be provided by 10-membered rings of oxygen atoms. These rings are formed by the regular disposition of the tetrahedra making up the anionic framework of the crystalline aluminosilicate: the oxygen atoms are bonded to the silicon or aluminum atoms at the centers of the tetrahedra.

The preferred zeolite polymerisation catalysts possess, in combination; a silica:alumina mole ratio of at least 12 and a structure providing constrained access to the crystalline free space.

The silica:alumina ratio may be determined by conventional analysis. This ratio represents, as closely as possible, the ratio in the rigid anionic framework of the zeolite crystal and excludes aluminum in the binder or in cationic or other form within the crystal channels. Although zeolites with a silica:alumnia ratio of at least 12 are useful, it is preferred to use zeolites having higher ratios, at least about 30. Such zeolites, after activation, acquire an intracrystalline sorption capacity for normal hexane which is greater than that for water, i.e. they exhibit "hydrophobic" properties.

The zeolites useful in the present invention freely sorb normal hexane and have a pore dimension greater than about 5 Angstroms. In addition, the structure provides constrained access to large molecules. It is sometimes possible to judge from the known crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although, in some instances, excessive puckering or pore blockage may render these zeolites ineffective. Twelve-membered rings do not generally appear to offer sufficient constaint to produce the advantageous conversions, although puckered structures exist such as TWA offretite which is a known effective zeolite. Also, structures can be conceived, due to pore blockage or other cause, that may be operative.

Rather than attempt to judge from crystal structure whether or not a zeolite possesses the necessary constrained access, a simple determination of the "constrained index" may be made by passing a mixture of an equal weight of normal hexane and 3-methylpentane continuously over a small sample, approximately 1 gram or less, of catalyst at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. (538° C.) for at least 15 minutes. The zeolite is then flushed with helium and the temperature adjusted between 550° F. (288° C.) and 950° F. (510° C.) to give an overall conversion between 10% and 60%. The mixture of hydrocarbons is passed at 1 liquid hourly space velocity (ie., 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromotography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Zeolites suitable for the present invention are those having a constraint index in the approximate range of 1 to 12. Constraint Index (CI) values for some typical zeolites are shown in Table 1 below:

TABLE 1

| CAS | C.I. |
|---|---|
| ZSM-5 | 8.3 |
| ZSM-11 | 8.7 |
| ZSM-12 | 2 |
| ZSM-38 | 2 |
| ZSM-35 | 4.5 |
| ZSM-41 | 1.5 |
| TMA Offretite | 3.7 |
| Beta | 0.6 |
| ZSM-4 | 0.5 |
| H-Zeolon | 0.4 |
| REY | 0.4 |
| Amorphous Silica-Alumina | 0.6 |
| Erionite | 38 |

It is to be realized that the above constraint index values typically characterize the specified zeolites but that such are the cumulative result of several variables used in determination and calculation thereof. Thus, for a given zeolite depending on the temperature employed within the aforenoted range of 288° to 510° C. with accompanying conversion between 10% and 60%, the constraint index may vary within the indicated approximate range of 1 to 12. Likewise, other variables such as the crystal size of the zeolite, the presence of possible occluded contaminants and binders intimately combined with the zeolite may affect the constraint index. It will accordingly be understood by those skilled in the art that the constraint index, as utilized herein, while affording a highly useful means for characterizing the zeolites of interest is approximate, taking into consideration the manner of its determination, with probability, in some instances, of compounding variable extremes. However, in all instances, at a temperature within the above-specified range of 288° to 510° C., the constraint index will have a value for any given zeolite of interest herein with the approximate range of 1 to 12.

The class of zeolites defined herein is exemplified by ZSM-5, ZSM-11, ZSM-12, ZSM-35, ZSM-38 and other similar materials. These zeolites are described, respectively, in U.S. Pat. Nos. 3,702,886, and 3,941,871, 3,709,979, 3,832,449, 4,016,245 and 4,046,859. The contents of these patents are incorporated in this specification by reference. These zeolites are the preferred materials for use in the present invention; ZSM-5 is particularly preferred.

The specific zeolites described, when prepared in the presence of organic cations, are catalytically inactive, possibly because the intracrystalline free space is occupied by organic cations from the forming solution. They may be activated by heating in an inert atmosphere at 550° C. in air. The presence of organic cations in the forming solution may not be absolutely essential to the formation of this type zeolite; however, the presence of these cations does appear to favor the formation of this special type of zeolite. More generally, it is desirable to activate this type catalyst by base exchange with ammonium salts followed by calcination in air at about 550° C. for about 15 minutes to 24 hours.

Natural zeolites may sometimes be converted to this type zeolite catalyst by various activation procedures and other treatments such as base exchange, steaming alumina extraction and calcination, in combinations. Natural minerals which may be so treated include ferrierite, brewsterite, stilbite, dachiardite, epistilbite, heulandite, and clinoptilolite.

The polymerisation occurs with various cations on the zeolite. However, it has been found that the rate of polymerisation is favored by a low sodium content in the zeolite. Generally, the sodium content should be kept below 1.5 weight percent, preferably below 1.0 weight percent and advantageously below 0.5 weight percent. It as been found that polymerisation takes place on zeolites which have, in fact, been sodium exchanged but in these cases the yield is poor. The desirability of maintaining a low sodium content persists at different silica:alumina ratios in the zeolite, as shown in Table 2 below. The zeolites indicated in Table 2 all polymerised tetrahydrofuran readily at room temperature.

TABLE 2

| Zeolite | $SiO_2:Al_2O_3$ (Ratio by wt.) | $Na_2O$ (Percent by wt.) |
|---|---|---|
| ZSM-5 | 68 | 1.2 |
| ZSM-5 | 77.3 | 1.0 |
| ZSM-5 | 298 | 1.5 |
| ZSM-5 | 1670 | 1.6 |
| HY | 4 | 0.4 |

The reactivity of the zeolite polymerisation catalyst is adversely affected by sorbed water. Due care should therefore be taken to ensure that the zeolite is as free of water as possible. This can be done by calcining the catalyst suitably at temperatures above 500° C. On the other hand, traces of water in the monomer are less deleterious although a water-free catalyst is preferred. The monomers may be dried by conventional dehydrating agents including sodium hydride, sodium borohydride and molecular sieves.

The particle size of the catalyst has an effect on the yield of the polymer. In general, the specific yield (weight of polymer per unit weight of catalyst) increases with decreasing crystalline size. Without being bound by theory it is believed that the sites on the catalyst which are responsible for the polymerisation (the Al sites) are blocked or rendered less accessible by the growing polymer and that this effect is more pronounced with increasing crystallite size. In general, crystallite sizes smaller than 0.02 microns are preferred. If the catalyst is not readily available, this particle size may be sub-divided, for example, by the thermal fracturing technique disclosed in U.S. Pat. No. 3,528,675. A number of fracturing cycles may be used, if necessary, to obtain the desired particle size.

The polymerization usually proceeds readily at room or slightly elevated temperatures simply upon contacting the monomer with the zeolite.

With tetrahydrofuran, the polymerization occurs over a wide range of temperatures, from below room temperature to 68° C., the boiling point of tetrahydrofuran.

The amount of zeolite polymerization catalyst can be as little as 0.01 wt. % based on the weight of the monomer. Useful concentrations generally range from 0.1 wt. % to 100 wt. % of the monomer preferably from 2.0 wt. % to 50 wt. %. The higher concentrations of catalyst generally form more viscous solutions of polymer in monomer, although the yield remains relatively constant over a range of catalyst concentrations. The time required after admixture or contacting of the zeolite and solvent can vary from about 0.1 hour to 100 hours and the temperature used may be up to 150° C., with the preferred range being 20° C. to 40° C., or up to the boiling point of the solvent if this is below 150° C. Reaction temperatures above the normal boiling point of the monomer may be used if the pressure in the monomer is increased to a value sufficient to maintain the monomer in the liquid phase. Alternatively, the monomer may be passed in the vapor state over the catalyst either in a fixed, moving or fluid bed.

The polymerisation reaction is interesting in that it is reversible and at every temperature there is an equilibrium monomer concentration that is thermodynamically determined. Therefore, the polymerisation cannot proceed beyond a given conversion, although in certain instances this may be quantitative. For any given polymerisation there may also be a ceiling temperature. This is the temperature above which the equilibrium monomer concentration is that of pure monomer, i.e. no polymerisation takes place above the ceiling temperature. For tetrahydrofuran the ceiling temperature is thought to be 85°±2° C. Elevated temperatures may be desired for certain monomers. For example, 1-2 epoxy styrene reacts quantitative at 60° C. but not at ambient temperature.

Another interesting feature of the process is that copolymers of differing types may be prepared from the same two monomers, the differences being created by the order of addition of the comonomers to the catalyst. For example, if furan is added to ZSM-5 catalyst, followed by tetrahydrofuran, a brown-purple, rubbery, tough polymer is produced. On the other hand, if tetrahydrofuran is added first, followed by furan, the product is a white polymer similar to that produced from the use of tetrahydrofuran alone.

It is believed that the polymer grows by living chains which form both inside and outside the zeolite. The growth of the living polymer chains can be terminated by the use of a suitable chain terminating agent. The chain terminating agents are usually materials which contain an active hydrogen atom. Suitable materials include water, ammonia, alcohols such as methanol, ethanol and propanol. Ammonia is preferred since it appears to be more effective.

The polymerization catalyst may be taken up in the polymer to form a complex of the catalyst and the polymer. This complex will usually be highly solvated by the remaining monomer to form a highly dispersed sol of the polymer-crystallite complex in the monomer. The formation of this sol is usually evidenced by increased viscosity. The intimate association of the polymer and the crystallite is demonstrated by degradation and masking of the usual X-ray diffraction pattern; the normal X-ray pattern is recovered on removal of the polymer. It appears that the minute zeolite crystals, which normally form aggregates due to electrostatic or other effects, are deflocculated as a consequence of the polymerisation reaction, and of the intimate association of the polymer and the catalyst.

The polymer is typically a high molecular weight, linear polyether. Molecular weights of the order of 500,000 are typical; in general, the molecular weight of the product will range from 250,000 to 500,000 (by GPC).

The following Examples illustrate further aspects of this invention. The tetrahydrofuran was purified by distillation from sodium borohydride under an atmosphere of nitrogen. The distilled product was kept refrigerated under nitrogen in sealed bottles. The ZSM-5 was calcined in air at 500° C. before use.

EXAMPLE 1

ZSM-5 was mixed with quartz chips. The mixture was placed in a Waring blender until an impalpable powder formed. This powder was mixed with glass beads in a column and tetrahydrofuran was passed down the column. The effluent was found to contain the ZSM-5. A similar column treated with toluene instead of tetrahydrofuran removed no solid material.

EXAMPLE 2

A mixture of tetrahydrofuran and one weight percent of ZSM-5 catalyst having a particle size of about 0.02 microns and a silica:alumina ratio of about 70:1, was stirred at room temperature for two days, after which the mixture was coagulated with water and dried. The dried coagulum contained 13 parts by weight of tetrahydrofuran polymer and one part by weight of ZSM-5. The X-ray structure of the ZSM-5 was almost completely masked. A portion of the coagulum was heated for 72 hours at 200° C. under vacuum; this treatment removed all the polymer. The X-ray structure of the recovered ZSM-5 was completely restored. A second portion of the coagulum was calcined for 3 hours at 500°. in oxygen and in this case, too, the X-ray structure of the recovered ZSM-5 was completely restored.

EXAMPLE 3

This Example illustrates the effect of temperature upon the yield of polymer.

Tetrahydrofuran (20 g.) and ZSM-5B catalyst (0.125 g.) were stirred together for 6 hours at various temperatures. The yield at the end of this time was determined. The results are shown in Table 3 below.

TABLE 3

| Temp. (°C.) | Yield (g.) |
| --- | --- |
| −78 | 0 |
| 0 | 0.02 |
| 25 | 0.30 |
| 68 | 0.40 |

EXAMPLE 4

This example illustrates the effect of time on the yield and molecular weight of the product.

Tetrahydrofuran (20 g.) was stirred with ZSM-5B (0.2 g.) for varying periods of time after which the yield of the polymer and its molecular weight were determined. The results are shown in Table 4 below.

TABLE 4

| Time (Hrs) | Yield (g.) | g. Polymer/ g. ZSM-5B | Molecular Weight |
| --- | --- | --- | --- |
| 1 | .056 | .3 | 130,000 |
| 2 | .117 | .6 | 30,000 |
| 7 | .320 | 1.5 | 90,000 |
| 24 | .813 | 4.0 | 240,000 |

EXAMPLE 5

This Example illustrates the effect of catalyst concentration on the yield of polymer.

Tetrahydrofuran (25 g.) was stirred with varying amounts of ZSM-5 for 72 hours. The yield of polymer was then determined. The results are given in Table 5 below.

TABLE 5

| Amount of Catalyst | Yield | g. Polymer/ g. ZSM-5B |
| --- | --- | --- |
| 10% (2.5 g) | 11.24 g | 4.5 |
| 1% (250 mg) | 3.31 g | 13.0 |
| 0.5% (125 mg) | 1.30 g | 10.5 |
| 0.1% (25 mg) | 0.27 g | 10.5 |
| 0.01% (2.5 mg) | Trace | Trace |

EXAMPLE 6

This Example illustrates the effect of the crystalline size of the catalyst on the specific yield.

Tetrahydrofuran (20 g.) was stirred for 24 hours with ZSM-5 catalysts of varying crystallite sizes. The amount of catalyst used was 0.2 g. in each case. The specific yield of polymer was then determined. The results are shown in Table 6 below.

TABLE 6

| Crystal Dimensions | Cryst. Part./g (calc) | g Polymer/g Cat. |
| --- | --- | --- |
| 5 × 2 × 2u (ZSM-5c) | $10^{11}$ | 1 |
| 0.02 × 0.02 × 0.02 u ZSM-5B) <0.02 av. | $2 \times 10^{17}$ | 20 |
| (Thermal fracture, 5 cycles) | $>2 \times 10^{17}$ | 100 |

We claim:

1. A method for making a high molecular weight, solid polymer, comprising polymerizing a tetrahydrofuran in the presence of crystalline aluminosilicate zeolite catalyst having a Constraint Index from 1 to 12 and a silica:alumina ratio of at least 12.

2. A method according to claim 1 in which the zeolite comprises ZSM-5.

3. A method according to claim 2 in which the sodium content of the ZSM-5 is less than 1.5 weight percent.

4. A method according to claim 3 in which the sodium content of the ZSM-5 is less than 1.0 weight percent.

5. A method according to claim 1 in which the zeolite comprises ZSM-11.

6. A method according to claim 1 in which the zeolite comprises ZSM-38.

7. A method according to claim 1 in which the polymerisation is carried out at a temperature from 20° to 40° C.

* * * * *